(12) United States Patent
Larkin et al.

(10) Patent No.: US 7,577,686 B1
(45) Date of Patent: Aug. 18, 2009

(54) DYNAMIC TABLE CONFIGURATION IN A VIRTUAL MACHINE

(75) Inventors: Michael K. Larkin, San Jose, CA (US);
Kiran Kamity, Santa Clara, CA (US);
Shanmuga Appajodu, San Jose, CA (US)

(73) Assignee: RingCube Technologies, Inc., Mountain View, CA (US)

( * ) Notice: Subject to any disclaimer, the term of this patent is extended or adjusted under 35 U.S.C. 154(b) by 370 days.

(21) Appl. No.: 11/525,727

(22) Filed: Sep. 22, 2006

Related U.S. Application Data

(60) Provisional application No. 60/771,998, filed on Feb. 10, 2006, provisional application No. 60/772,000, filed on Feb. 10, 2006, provisional application No. 60/772,001, filed on Feb. 10, 2006, provisional application No. 60/772,002, filed on Feb. 10, 2006, provisional application No. 60/811,572, filed on Jun. 6, 2006, provisional application No. 60/811,582, filed on Jun. 6, 2006, provisional application No. 60/811,591, filed on Jun. 6, 2006.

(51) Int. Cl.
*G06F 17/30* (2006.01)
*G06F 7/00* (2006.01)

(52) U.S. Cl. .............. 707/104.1; 707/200; 707/205; 718/104; 718/103

(58) Field of Classification Search .............. None
See application file for complete search history.

(56) References Cited

U.S. PATENT DOCUMENTS

| 7,424,709 | B2 * | 9/2008 | Neiger et al. .............. 718/1 |
| 2002/0147810 | A1 * | 10/2002 | Traversat et al. .......... 709/224 |
| 2005/0021788 | A1 * | 1/2005 | Tucker et al. .............. 709/229 |
| 2007/0050770 | A1 * | 3/2007 | Geisinger .................. 718/100 |
| 2009/0025006 | A1 * | 1/2009 | Waldspurger .............. 718/104 |

* cited by examiner

*Primary Examiner*—Kuen S Lu
*Assistant Examiner*—Loan T Nguyen
(74) *Attorney, Agent, or Firm*—Carr & Ferrell LLP

(57) ABSTRACT

A system, method, and software product provides for managing resources in a virtual machine. The system comprises a guest memory and a processor. The guest memory stores a file exception table and a file inclusion table. The file exception table indicates at least one first name of a host resource. The file exclusion table indicates at least one second name of a guest resource. The processor receives a resource query, processes the resource query to determine a host weight value using a weighting operation and the file exception table. The processor also processes the resource query to determine a guest weight value using the weighting operation and the file inclusion table. Additionally, the processor compares the host weight value to the guest weight value to determine whether the resource query is associated with the host resource or the guest resource.

9 Claims, 9 Drawing Sheets

| | RESULT | FET ENTRY | FIT ENTRY | GUEST |
|---|---|---|---|---|
| 910 | ABC.EXE | | ABC.EXE | |
| 912 | ABC.EXE | ABC.EXE | ABC.EXE | |
| 914 | ABC.EXE | ABC.EXE | ABC.EXE | ABC.EXE |
| 916 | ABC.EXE | | ABC.EXE | ABC.EXE |

FIG. 9

DYNAMIC TABLE CONFIGURATION IN A VIRTUAL MACHINE

CROSS-REFERENCE

This U.S. nonprovisional patent application claims the benefit of U.S. Provisional Patent Application Ser. No. 60/811,582, filed on Jun. 6, 2006, entitled "Systems and Methods for a Hot Pluggable Virtual Machine," U.S. Provisional Patent Application No. 60/811,591, filed on Jun. 6, 2006, entitled "Intelligent Resource Management for a Virtual Machine," U.S. Provisional Patent Application No. 60/811,572, filed on Jun. 6, 2006, entitled "Intelligent Resource Management using a Dynamic Table for a Virtual Machine," U.S. Provisional Patent Application No. 60/771,998, filed on Feb. 10, 2006, entitled "Dynamic Table System," U.S. Provisional Patent Application No. 60/772,000, filed on Feb. 10, 2006, entitled "System and Method For Virtualizing An Operating System," U.S. Provisional Patent Application No. 60/772,001, filed on Feb. 10, 2006, entitled "Hot Pluggable/Transportable Virtual Environment," and U.S. Provisional Patent Application No. 60/772,002, filed on Feb. 10, 2006, entitled "Intelligent Resource Management for a Virtual Machine", which are all incorporated herein.

The present application is related to U.S. Nonprovisional patent application Ser. No. 11/525,888, filed on Sep. 22, 2006, entitled "Intelligent Resource Management for a Virtual Machine," and U.S. Nonprovisional patent application Ser. No. 11/525,726, filed on Sep. 22, 2006, entitled "Hot Pluggable Virtual Machine," which are also incorporated herein.

BACKGROUND OF THE INVENTION

1. Field of the Invention

This invention relates generally to managing resources in a virtual machine environment and more specifically to a dynamic table configuration in a virtual machine.

2. Description of the Related Art

Virtual machines (VMs) allow a computer to simultaneously support and execute two or more computing environments. A computer environment comprises the operating system as well as user applications and data. A VM is configured to borrow computing resources such as CPU, disk, and memory from a host computer and co-exist alongside the host computer as a guest computer.

Due to a large software footprint, current VMs can not be easily transported from one host computer to another host computer. To be portable, the VM requires the capability to adapt to any given host environment and reconfigure its resources based on the presence or absence of hardware or operating system resources on the host system. Additionally, the resources on the guest computer must remain isolated from the resources on the host computer, and vice-versa.

When a VM accesses operating system resources on the host computer, the host computer isolates certain operating system resources such as the file system, registry, kernel objects and services from the guest computer. As such, there exists a need to determining whether to access operating system resources within the host computer or operating system resources within the guest computer to maintain isolation between the host computer and the guest computer.

SUMMARY OF THE INVENTION

An exemplary system for managing resources in a virtual machine comprises a guest memory and a processor. The guest memory may store a file exception table and a file inclusion table. The file exception table indicates at least one first name of a host resource. The file exclusion table indicates at least one second name of a guest resource. The processor receives a resource query and processes the resource query to determine a host weight value using a weighting operation and the file exception table. The processor also processes the resource query to determine a guest weight value using the weighting operation and the file inclusion table. Additionally, the processor compares the host weight value to the guest weight value to determine whether the resource query is associated with the host resource or the guest resource.

The system may determine whether the resource query matches the at least one first name of the host resource or the at least one second name of the guest resource. The processor may write the guest resource to the guest memory. The second name of the guest resource may comprise a registry filename. The at least one first name of the host resource may be associated with a kernel object. The processor may receive a query directory command and process the query directory command to obtain first results according to the file exception table. The processor may process the query directory command to obtain second results according to the file inclusion table and blend the first results with the second results to produce blended results. The processor may filter the blended results according to whether the guest resource associated with the second results exists in the guest memory.

The exemplary method for managing resources in a virtual machine includes storing a file exception table comprising at least one first name of a host resource in a guest memory and storing a file inclusion table comprising at least one second name of a guest resource in the guest memory. The method also includes receiving a resource query and processing the resource query to determine a host weight value using a weighting operation and the file exception table and to determine a guest weight value using the weighting operation and the file inclusion table. The method also comprises comparing the host weight value to the guest weight value to determine whether the resource query is associated with the host resource or the guest resource.

A software product for managing resources in a virtual machine comprises software and a storage medium that stores the software. The software is operational when executed by a processor to direct the processor to store a file exception table comprising at least one first name of a host resource and a file inclusion table comprising at least one second name of a guest resource in a guest memory. The software is also operational when executed by the processor to receive and process a resource query to determine a host weight value using a weighting operation and the file exception table, and to determine a guest weight value using the weighting operation and the file inclusion table. The software is additionally operational when executed by the processor to compare the host weight value to the guest weight value to determine whether the resource query is associated with the host resource or the guest resource.

BRIEF DESCRIPTION OF THE DRAWINGS

FIG. 9 is an illustration of a table for filtering results of a directory query in an exemplary implementation of the invention.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for managing resources in a virtual machine includes a guest memory, a host memory, and a processor. The guest memory is a memory associated with a guest computer comprising guest resources and dynamic tables. The guest resources include files such as applications, data files, registry entries, and kernel objects that are stored within the guest memory. The host memory is a memory associated with a host computer for storing host resources including, for example, applications, registry entries, and kernel objects. The dynamic tables each comprise a single dimensional table for storing names of operating system resources, where the names are categorized into a suitable taxonomy for the operating system in use. The processor processes a resource query such as a resource request or a directory query according to the dynamic tables.

By processing the resource query using the dynamic tables, the system can advantageously operate a virtual machine in a host machine using operating system resources installed in the host machine. For example, in an operating system overlay, the dynamic tables dictate whether to use an operating system file stored in the host memory or an operating system file stored in the guest memory. Further, the dynamic tables advantageously provide host resources and/or guest resources in response to a file operation to determine whether a file exists. Additionally, the dynamic tables may be configured to store additional entries to enable a guest environment to operate on another host machine independently of the resources that are installed on the other host machine.

Figure 1:
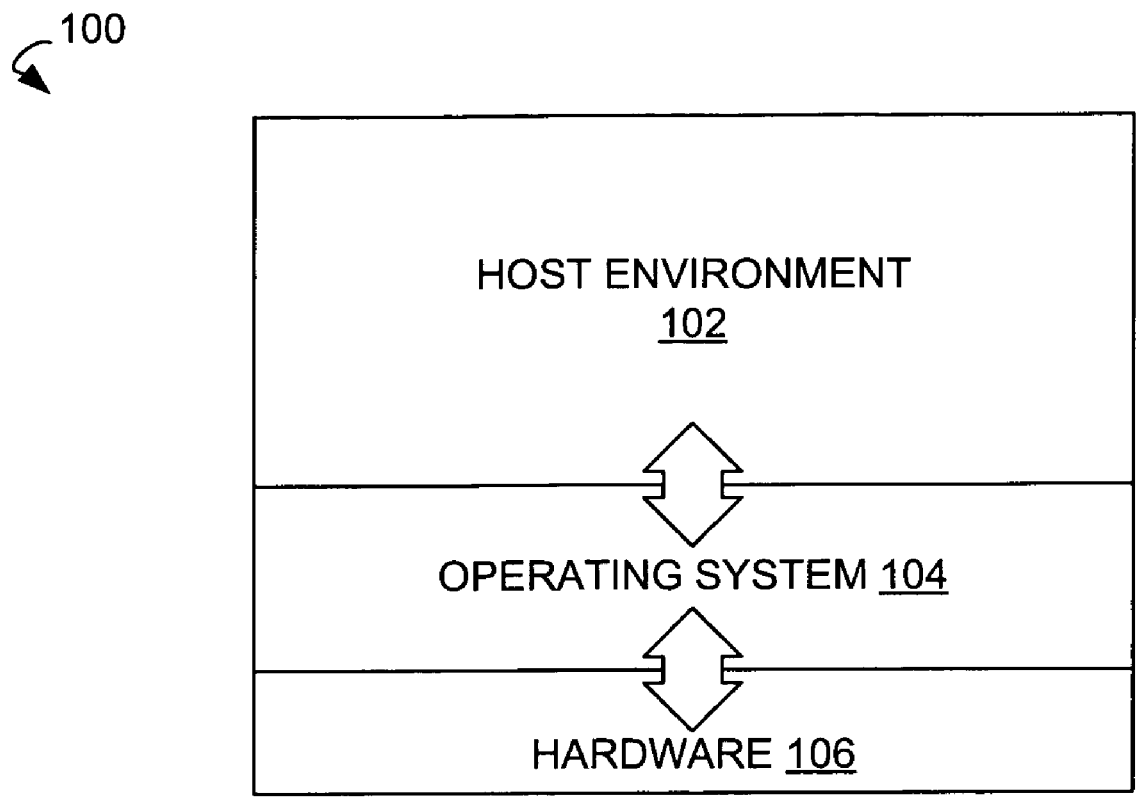
FIG. 1 is an illustration of a system for hosting a virtual machine in an exemplary implementation of the invention.

FIG. 1 depicts a host system 100 for hosting a virtual machine according to one implementation of the invention. The host system 100 comprises a host environment 102, an operating system 104, and hardware 106. The host environment 102 receives instruction from and transmits instructions to the operating system 104. The operating system 104 receives data and transmits instructions to the hardware 106.

The host environment 102 comprises, for example, user applications and data files stored within a host memory. The host environment 102 may further access, for example, library files, configuration files, registries and/or or kernel objects. The operating system 104 comprises, for example, Windows® or Linux®. The hardware 106 includes hardware resources such as ports, processors, memory, and input/output devices including, for example, a display, speakers, printers, a keyboard, and/or a mouse. In operation, a user may operate the host system 100 as if the host system 100 is a personal computer without a virtual machine. The host environment 102 may be substantially unaffected by the presence of a virtual machine.

Figure 2:
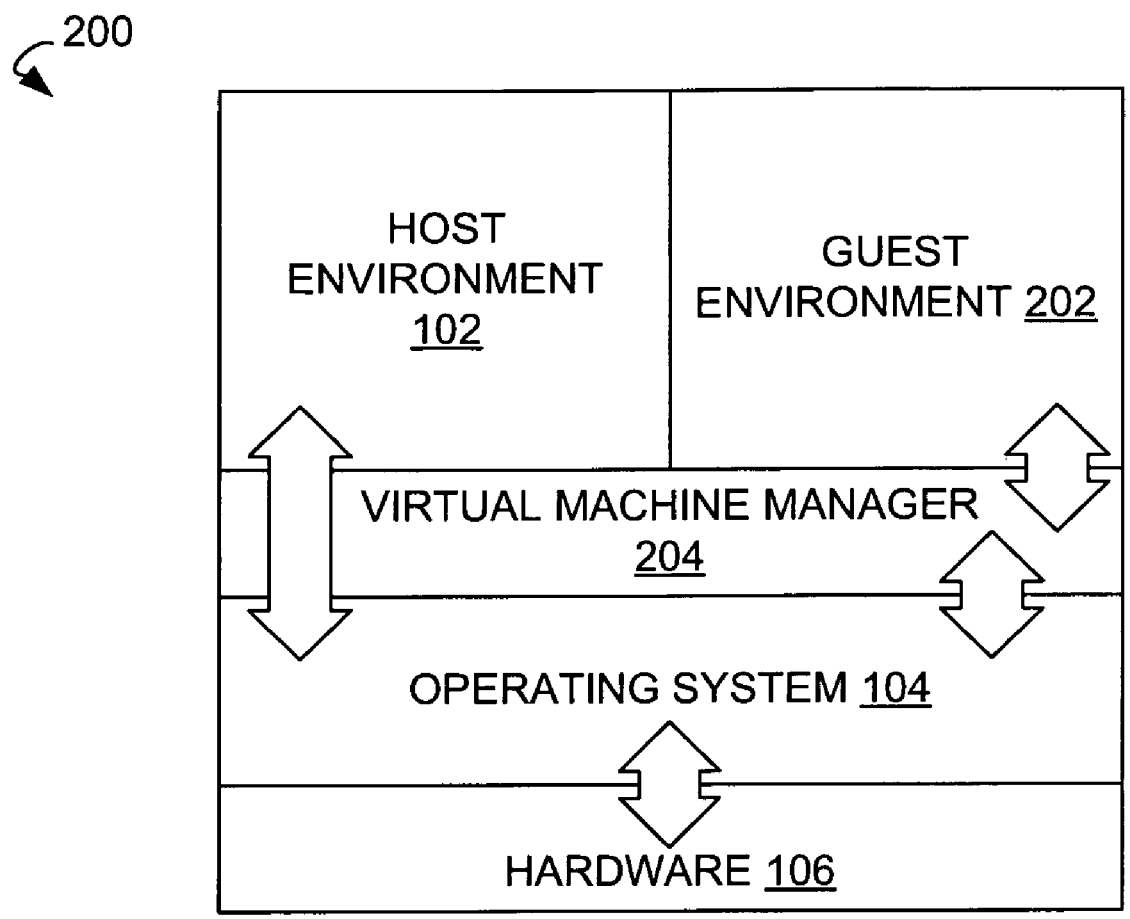
FIG. 2 is an illustration of a block diagram of a host computer in an exemplary implementation of the invention.

FIG. 2 depicts a block diagram of a host computer 200 according to an exemplary embodiment of the invention. The host computer 200 comprises a host memory 202, a processor 204, a port interface 206 and a bus 208. The host computer 200 may be communicatively coupled to a guest memory 210 via the port interface 206. The bus 208 couples the host memory 202, the processor 204, and the port interface 206. In some embodiments, the host computer 200 comprises a personal computer. The host memory 202 stores files, applications, and resources in a memory such as a hard disk. The port interface 206 may comprise, for example, a Universal Serial Bus (USB) port. The guest memory 210 is portable and may comprise a hard disk and a port interface associated with the port interface 206.

Figure 3:
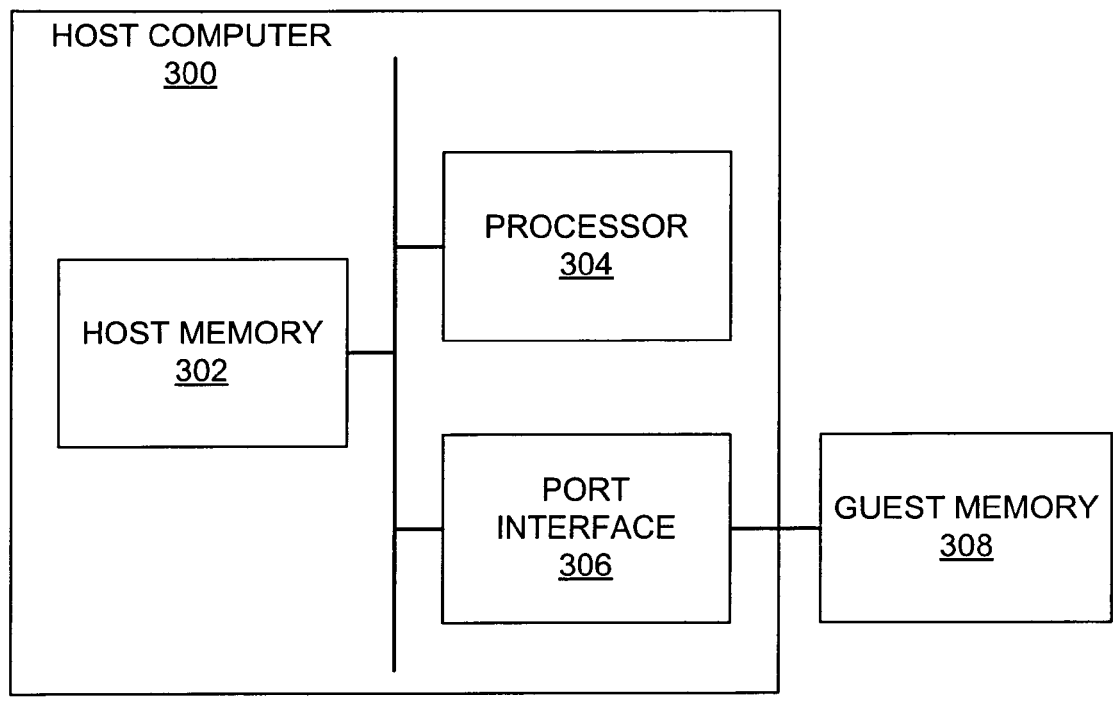
FIG. 3 is an illustration of a system comprising a virtual machine in an exemplary implementation of the invention.

FIG. 3 depicts a system 300 comprising a virtual machine according to an exemplary implementation of the invention. The system 300 uses the operating system 104 and the hardware 106 of host system 100 to execute applications within a portable guest environment. The system 300 may comprise the host environment 102, the operating system 104, the hardware 106, a guest environment 302, and a virtual machine manager 304. The guest environment 302 receives instructions from and transmits instructions to the virtual machine manager (VMM) 304. The VMM 304 is executed by the processor 204 and interrupts instructions from and transmits instructions to the operating system 104.

The guest environment 302 may be stored within the guest memory 210 and comprises files specific to a virtual machine. The processor 204 executes the guest environment 302. Files within guest environment 302 may comprise application files, data files, registry files, library files, configuration files, kernel objects, and/or cookies. The guest environment 302 additionally comprises dynamic tables for determining whether to read files associated with the guest memory 210 or the host memory 202.

The dynamic tables may contain a list of resources associated with the operating system 104. In some embodiments, the list of resources corresponds to files stored on the host memory 202 or the guest memory 210. In some embodiments, the dynamic tables comprise a File Exception Table (FET) and a File Inclusion Table (FIT). The FET may indicate that a resource should be read from the host memory 202, and the FIT may indicate that a resource should be read from the guest memory 210.

The dynamic table entries indicate a file name having a standard hierarchical file structure in a table. For example, the file name "\WINDOWS\TEMP" may appear in the FIT and the file name "\WINDOWS" may appear in the FET. In this example, a file in "\WINDOWS\TEMP" will be read from the guest memory 210 but a file in "\WINDOWS\SYSTEM" will be read from the host memory 202. The dynamic table entries may be treated as rules discussed in connection with FIG. 5, for example.

Figure 4:
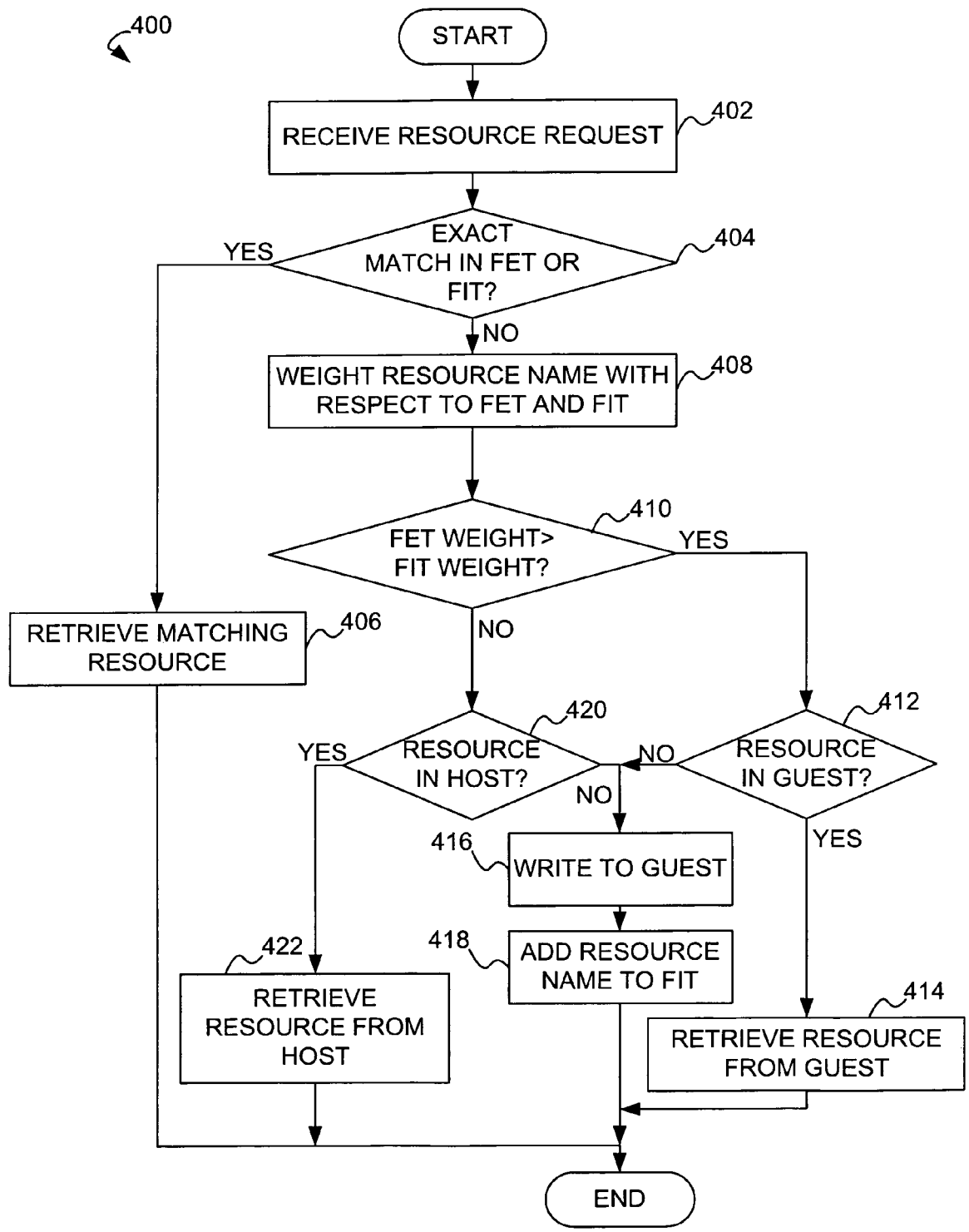
FIG. 4 is an illustration of a flowchart for retrieving a resource according to dynamic tables in an exemplary implementation of the invention.

FIG. 4 depicts a flowchart illustrating a process 400 for retrieving a resource using dynamic tables according to one implementation of the invention. A resource may comprise a file, an application, a registry key, a kernel object, a directory, a database, or the like. The process 400 may also be used to bifurcate operating system 104 files or in systems that use copy-on-write to shadow resources.

The VMM 304 performs the process 400 which includes: step 402, receiving a resource request; step 404, determining whether there is an exact match; step 406, if there is an exact match, retrieving the matching resource; step 408 weighting the resource name; step 410, determining whether a FIT weight is greater than a FET weight; step 412, if the FIT weight is greater than the FET weight, determining whether the resource exists in the guest memory 210; and step 422, if the FET weight is greater than the FIT weight, determining whether the resource exists in the host memory 202. If the resource exists in the host memory 202, the resource is read from the host memory 202 in step 422. If the resource exists in the guest memory 210, the resource is read from the guest memory 210 in step 414. If the resource does not exist in either the guest memory 210 or the host memory 202, the resource is written to the guest memory 210 in step 416; the resource name is added to the FIT in step 418 to indicate that the resource will subsequently be accessed from the guest memory 210.

In step 402, the VMM 304 receives a resource request from the operating system 104 or the guest environment 302. The guest environment 302 may, for example, be running an application that calls an operating system resource such as a registry file. Alternatively, the operating system 104 may request data from an application running within the host environment 102.

In step 404, the VMM 304 determines whether there is an exact match listed in the FIT or the FET. If there is an exact match, the operating system 104 retrieves the matching resource in step 406. For example, if there is an exact match in the FIT, the VMM 304 instructs the operating system to retrieve the resource from the guest memory 210. Alternatively, if there is an exact match in the FET, the VMM 304 instructs the operating system to retrieve the resource from the host memory 202.

If there is not an exact match, the VMM 304 weights the resource name with respect to the FET and the FIT in step 408. The weighting process is discussed in greater detail in connection with FIG. 5. In step 410, the VMM 304 determines whether the FIT weight is greater than the FET weight.

In some instances, such as when a filename or any of the names of the parent folders does not exist in either the FET or in the FIT, the FIT weight and the FET weight will be equal. In these situations, the VMM 304 may determine that the resource does not exist in either the host memory 202 or in the guest memory 210. If the resource does not exist, the VMM 304 may write the resource to guest memory 310.

If the FIT weight is greater than the FET weight, the VMM 304 determines whether the resource exists in the guest memory 210 in step 412. If the resource exists, the VMM 304 instructs the operating system 104 to read the resource from the guest memory 210 in step 414. In some situations, including those described in connection with FIG. 8 and FIG. 9 or if the resource is created within the guest environment 302, the resource name may be included in the FIT even though the resource does not exist in the guest memory 210. In these situations, the resource is written to the guest memory 310 in step 416. In step 418, the resource name is added to the FIT.

If the FIT weight is less than the FET weight, the VMM 304 determines whether the resource exists in the host memory 102 in step 420. If the resource does not exist, the VMM 304 performs step 416 and 418. If the resource exists, the VMM 304 instructs the operating system 104 to read the resource from the host memory 102.

Figure 5:
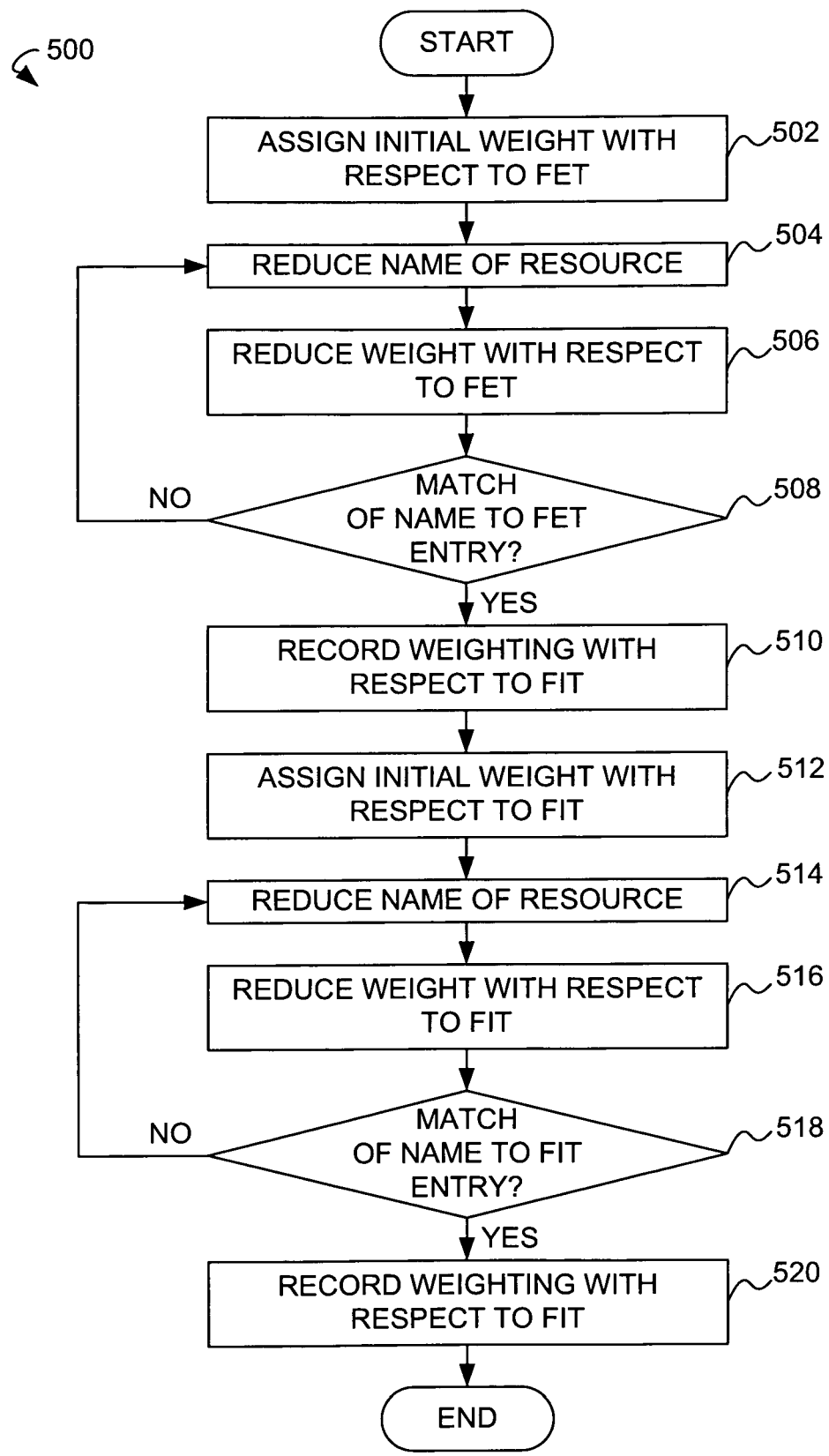
FIG. 5 is an illustration of a flowchart for determining a weighting according to dynamic tables in an exemplary implementation of the invention.

FIG. 5 depicts a flowchart illustrating a process 500 for determining a FET weight and a FIT weight with respect to a resource name. The process 500 may be performed during step 408 of the process 400. The process 500 uses the hierarchal file structure of the resource name to compare the resource name to the entries in the dynamic tables to determine whether the resource is likely to be in the host memory 202 or the guest memory 210. The process 500 comprises: step 502, assigning an initial weight with respect to the FET; step 504, reducing the name of the resource; step 506, reducing the weight with respect to the FET; step 508, determining whether the name matches to an FET entry; step 510, recording the weight with respect to the FET; step 512, assigning an initial weight with respect to the FIT; step 514, reducing the name of the resource; step 516, reducing the weight with respect to the FIT; step 518, determining whether the name matches to an FIT entry; and step 520, recording the weight with respect to the FIT. In various embodiments, the weight may be increased in steps 506 and 516. In other embodiments, steps 512 through 520 may be performed before or simultaneously with steps 502 through 510.

In step 502, the VMM 304 assigns an initial weight of the resource name with respect to the FET. In one implementation, the initial weight is set to zero. In step 504, the VMM 304 reduces the resource name by one hierarchal level. For example, "\WINDOWS\INSTALLER\FILES\X.TXT" reduces to "\WINDOWS\INSTALLER\FILES." In step 506, the VMM 304 reduces the FET weight. For example, the VMM 304 reduces the FET weight from zero to −1.

In step 508, the VMM 304 determines whether the reduced name appears as an entry in the FET. If the reduced name does not appear, the process 500 returns to step 504. For example, in the next iteration, the further reduced resource name is "\WINDOWS\INSTALLER," and the FET weight reduces to −2.

In step 510, if the reduced resource name appears in an entry in the FET, the VMM 304 records the FET weight. For example, if the first matching entry in the FET is "\WINDOWS," the FET weight is −3. The final FET weight may be referred to as the host weight value.

In steps 512 through 520, the VMM 304 repeats steps 502 through 510 with respect to the entries in the FIT rather than the entries in the FET. In some embodiments, the FIT table may additionally include an empty or null entry. Thus, if the resource does not exist, the FIT weight will be greater than the FET weight and the resource may be stored in the guest memory 210. The final FIT weight may be referred to the guest weight value. Continuing the above example, if the first matching entry in the FIT is "\WINDOWS\INSTALLER," the FIT weight is −2. Thus, when the VMM 304 returns to step 410 in process 400, the FIT weight (e.g., −2) is greater than the FET weight (e.g., −3), and the VMM 304 instructs the operating system to search for the resource in the guest memory 210.

Figure 6:
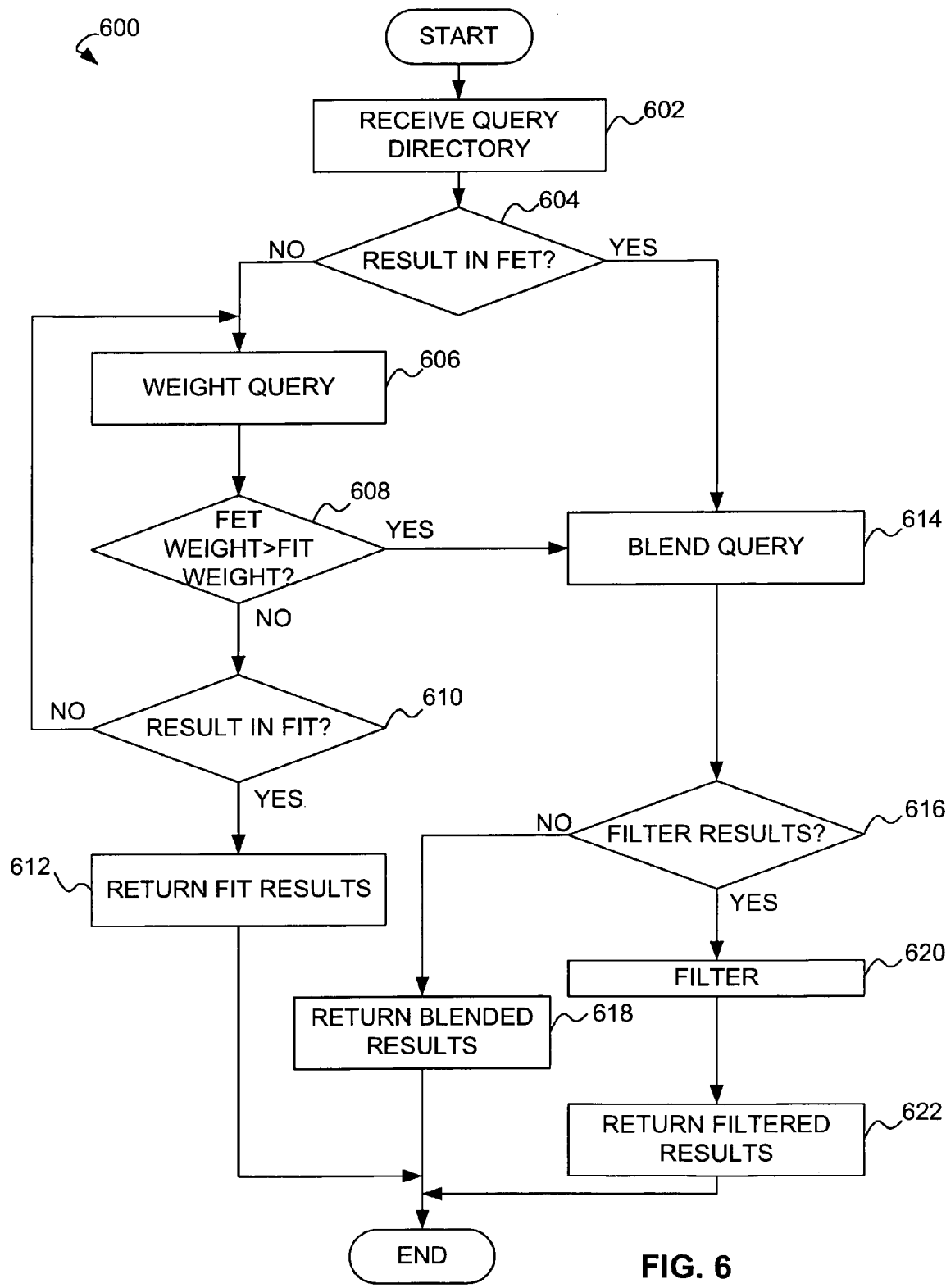
FIG. 6 is an illustration of a flowchart for processing a directory query according to dynamic tables in an exemplary implementation of the invention.

FIG. 6 depicts a flowchart illustrating process 600 for processing a resource query received by the VMM 304 comprising a "query directory" command or other instruction checking whether a file exists. In operation, the resource may exist in the host memory 202 and/or the guest memory 210. In some embodiments, the resource may exist only in the host memory 202 but may be needed in the guest memory 210 if the guest memory 210 connects to another host computer 200. In these embodiments, the resource in the guest memory 210 is returned in response to the directory query rather than the resource in the host memory 202, or, if the resource is not in the guest memory, a null result is returned to the operating system 204.

Blending is a process for executing system calls such as a query directory command in both the host environment 102 and the guest environment 302. For example, if the resulting directory appears in both the FET and the FIT, the VMM 304 may return a first list of files within the directory in the host environment 102 and a second list of files within the directory of guest environment 302. The VMM 304 uses the blending process to combine these lists when a query directory command is received. In some embodiments, the VMM 304 combines these duplicate lists such that the files appear to the operating system 104 to be within a single folder or directory in the host environment 102 or the guest environment 302. In further embodiments, files having the same name in the host environment 102 and the guest environment 302 may appear to the operating system 104 as a single file in the host environment 102 or the guest environment 302. The blending process is discussed further in connection with FIG. 7.

The process 600 is performed by the VMM 304 and includes: step 602, receiving the query directory; step 604, determining whether the result is in the FET; step 606, if the result is in the FET, weight the query with respect to the FET and the FIT; step 608, determine whether the FET weight is greater than the FIT weight; step 610, if the FET weight is less than the FIT weight, determine whether the result is in the FIT; step 612, if the result appears in the FIT, return the FIT results; step 614, if the result appears in the FET or if the FET weight is greater than the FIT weight, blending the query; step 616, determining whether to filter the blended results; step 618, if the blended results are not filtered, returning the blended results; step 620, if the blended results are filtered, filtering the results; and step 622, returning the filtered results.

In step 602, the VMM 304 receives a query directory command for a list of files within a folder or other command that checks for the existence of a resource in the host environment 102 or the guest environment 302. The VMM 304, in step 604, determines whether the result of the query comprises an exact match to an entry in the FET. If there is an exact match in the FET, the VMM 304 performs a blending process to also search for results in the FIT in step 614.

If there is not an exact match in the FET, the resource name being queried is weighted in step 606. The weighting may be performed using the process 500. In step 608, the VMM 304 determines whether the FET weight is greater than the FIT weight. If the FET weight is greater, the VMM performs the blending process in step 614. If the FET weight is not greater, the VMM 304 determines whether the results to the query directory command appear as an entry in the FIT in step 610. If the results are not in the FIT, the VMM 304 repeats steps 606 through 610 to verify that the host memory 202 has not added the resource. For example, a user may move the guest memory 210 to another host computer 200 in which the resource is available in the other host memory 202. If the FIT entries include the results of the directory query command, the VMM 304 returns the FIT results in step 612. In some embodiments, if the resource does not exist in the FIT, the VMM 304 may instruct the operating system 104 that the resource does not exist. Further, the VMM 304 may instruct the operating system 104 to write the resource to the guest memory 210 and add the resource name to the FIT.

If there is an exact match in the FET in step 604 or the FET weight is greater than the FIT weight in step 608, the VMM 304 blends the results of the query directory command in step 614. In other implementations, the VMM 304 may perform the blending process when the directory is an exact match in the FIT. The VMM 304 may also blend the results of a query directory command if the FIT weight is greater than the FET weight.

In step 616, the VMM 304 determines whether to filter the blended results. The filtering process removes one or more entries within the blended list of files. For example, files stored in the host memory 202 may be removed from the blended results or files stored in the guest memory 210 may be removed. If the results of the query directory do not need to be filtered, the VMM 304 returns the blended results in step 618.

In some embodiments, the blended results are filtered when an application installer executes a query directory command to determine whether files and/or directories are present. If the files and/or directories are present in the host memory 202 but not the guest memory 210, the application installer program will not install the files and/or directories if the blended results are returned. If this happens, the application will execute properly when the guest memory 210 is connected to the host computer 200 because the VMM 304 will access the files and/or directories on the host memory 202. If, however, the guest memory 210 connects to another host computer 200 in which the folders and/or directories do not exist, the application may not execute properly. Thus, to ensure that the guest memory 210 comprises all the components necessary to run an installed application, the VMM 304 filters the blended results to return files and/or directories only present in the guest memory 210 when the operating system 104 installs an application.

If the VMM 304 determines that the blended results will be filtered, the VMM 304 filters the blended results in step 620. One implementation of the filtering process is discussed in connection with FIG. 8 and FIG. 9. After the VMM 304 filters the results, the VMM 304 returns the filtered list of files and/or directories to the operating system 104.

Figure 7:
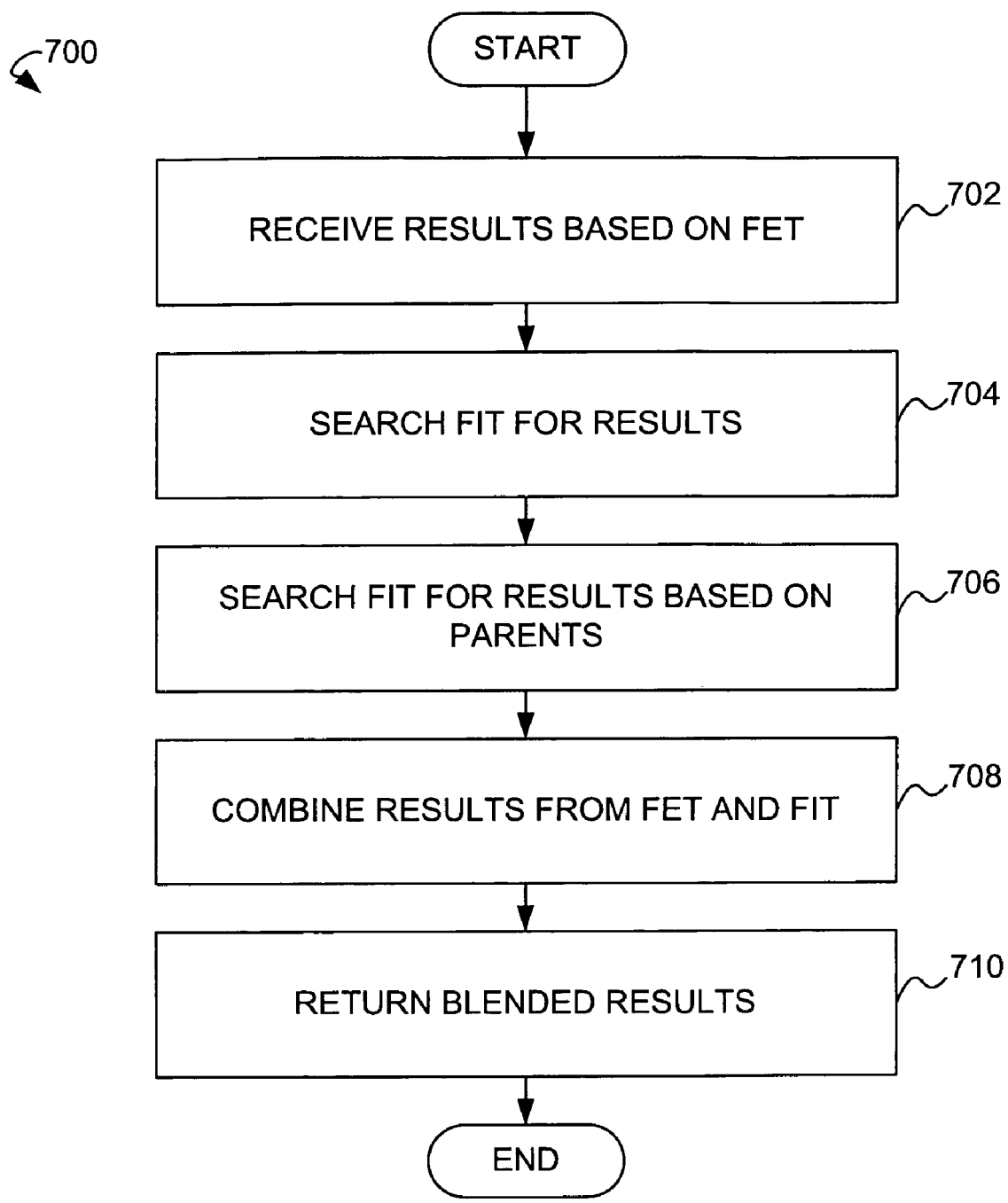
FIG. 7 is an illustration of a flowchart for blending results of a directory query in an exemplary implementation of the invention.

FIG. 7 depicts a flowchart illustrating a blending process 700 according to one implementation of the invention. The VMM 304 may perform the blending process 700 in step 614 of the process 600 in response to a query directory command. The blending process 700 comprises: step 702, processing the results with respect to the FET; step 704, searching the FIT for results; step 706, searching the FIT for results according to parent folders; step 708, combining results received with respect to the FET and the FIT; and step 710, return blended results. The VMM 304 may perform steps 702, 704, and 706 in any order or simultaneously.

In step 702, the VMM 304 processes the results of the query directory command with respect to the FET. The results may be based on an exact match generated in step 602 or a weighting generated in step 608. If the results are based on the weighting in step 608, the VMM 304 locates the files and/or directories within the host memory 202.

In step 704, the VMM 304 searches the FIT for exactly matching results according to the query directory command. The VMM 304 will then search parent folders of the files and/or directories according to the query directory command in step 706. By searching the parent folders, the VMM 304 may find related files and/or directories that do not exactly match the query directory. These two sets of results may be combined.

In step 708, the VMM 304 combines the results from the FET and the FIT. The combined set of results comprises a list of the files and/or directories in the FET and/or the FIT. In some embodiments, duplicate entries may be combined into one. In one embodiment, the blended results appear to the operating system 104 as a single folder stored in the host memory 202.

Figure 8:
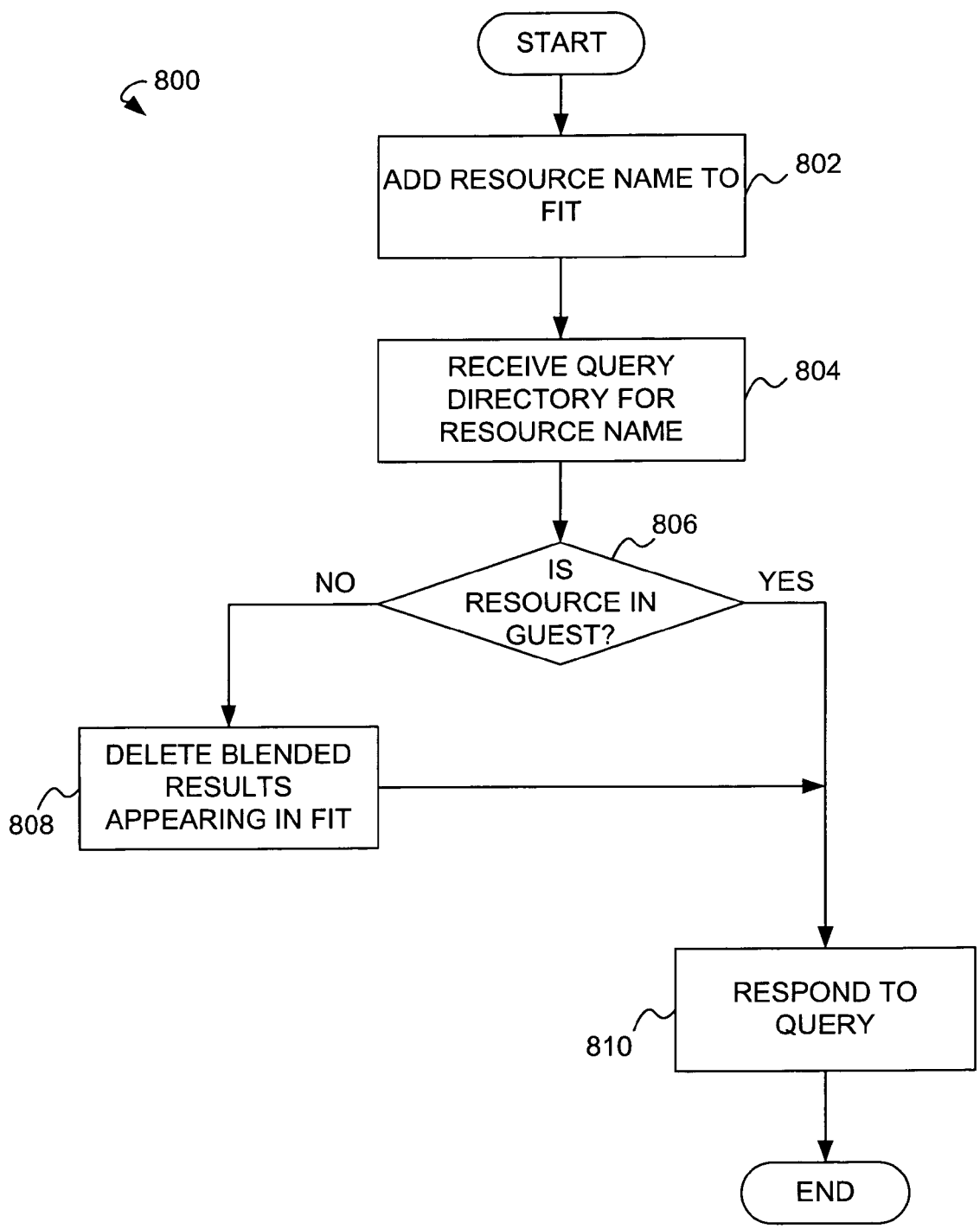
FIG. 8 is an illustration of a flowchart for filtering results of a directory query in an exemplary implementation of the invention.

FIG. 8 depicts a flowchart illustrating filtering process 800 according to one implementation of the invention. The filtering process 800 removes entries in the blended results based on a match in the FET. The filtering process 800 generates filtered results in response to a query directory command indicating the existence of a file and/or directory in the guest memory 210. The VMM 304 may perform a portion of the filtering process 800 during step 620 in the process 600. The filtering process 800 includes: step 802, add resource name to FIT; step 804, receive query directory for resource name; step 806, determine whether resource exists in the guest memory 210; and step 808, if resource does not exist in the guest memory, delete blended results that appear in the FIT.

In step 802, a user or an application adds a resource name to the FIT. The resource name is a resource that is known to be required by an application that may be installed on the guest memory 210. For example, if a user knows that a music downloading application also requires a media player application to be executed properly, the user adds an entry to the FIT indicating the media player application regardless of whether the media player application exists in the guest memory 210.

In step 804, the VMM 304 receives a query directory indicating a resource name. In step 806, the VMM 304 determines whether the resource associated with the resource name exists in the guest memory 210. If the resource exists, the filtered results include the resource name to indicate to the operating system that the resource has been previously installed on the host computer 200. If the resource does not exist in the guest memory 210, the VMM 304 deletes the blended results appearing in the FIT in step 808. Thus, the VMM 304 returns filtered results to the operating system 104 indicating that the resource does not exist regardless of whether the resource exists in the host memory 202.

To illustrate, FIG. 9 depicts a filtering table 900 illustrating four scenarios that the filtering process 800 may encounter. The filtering table 900 includes a result column 902, a FET entry column 904, a FIT entry column 906, and a guest resource column 908. The filtering table also includes four scenarios 910, 912, 914, and 916. The result column 902 depicts the resource name of a blended result, "FOO.EXE" generated in response to a query directory command. The FET entry column 904 indicates whether the resource name appears as an entry in the FET. The FIT entry column 906 indicates whether the resource name appears as an entry in the FIT. In the shown embodiment, the resource name "FOO.EXE" appears in the FIT in each scenario because "FOO.EXE" is required by another application that may be installed in the guest memory 210. For example, FOO.EXE may comprise a media player application that is required when a music downloading application is executed. Guest resource column 908 indicates whether the resource associated with "FOO.EXE" exists in the guest memory 210.

For example, in scenario 910, the result "FOO.EXE" is not included in the FET nor indicated as being a guest resource. Thus, in step 806, the VMM 304 determines that the resource does not exist in the guest memory 210. In step 808, the VMM 304 deletes this blended result appearing in the FIT. Thus, the VMM 304 instructs the operating system 104 that FOO.EXE does not exist in the host memory 202 or the guest memory 210. The operating system 104 will install FOO.EXE in the guest memory 302.

In scenario 912, the result "FOO.EXE" is included in the FET but not indicated as a guest resource. In scenario 912 without the filtering process 800, the operating system 104 does not download FOO.EXE to the guest memory 210, and if the guest memory 210 is transferred to another host computer, the application being installed that requires FOO.EXE may not execute properly. However, in step 806 of the filtering process 800, the VMM 304 determines that the resource does not exist in the guest memory 210. In step 808, the VMM 304 deletes the blended result because it appears in the FIT. Thus, the operating system 104 installs FOO.EXE on the guest memory 210 because the FET entry also no longer appears in the blended results.

In scenarios 914 and 916, the resource FOO.EXE exists in the guest memory 210 as indicated by guest resource column 908. Thus, in step 806, the VMM 304 determines that the resource exists in the guest memory 210 and the blended result "FOO.EXE" is included. It should be noted that the result "FOO.EXE" is included regardless of whether "FOO.EXE" appears in the FET because FOO.EXE exists in the guest memory 210.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for managing resources in a virtual machine, the system comprising:
   a guest memory configured to store a file exception table comprising at least one first name of a host resource and a file inclusion table comprising at least one second name of a guest resource; and
   a processor configured to:
   receive a resource query, process the resource query to determine a host weight value using a weighting operation and the file exception table, process the resource query to determine a guest weight value using the weighting operation and the file inclusion table, and compare the host weight value to the guest weight value to determine whether the resource query is associated with the host resource or the guest resource;
   determine whether the resource query matches the at least one first name of the host resource or the at least one second name of the guest resource;
   receive a query directory command and process the query directory command to obtain first results according to the file exception table;
   process the query directory command to obtain second results according to the file inclusion table and blend the first results with the second results to produce blended results; and
   write the guest resource to the guest memory.

2. The system of claim 1 wherein the at least one second name of the guest resource comprises a registry filename.

3. The system of claim 1 wherein the at least one first name of the host resource is associated with a kernel object.

4. A method for managing resources in a virtual machine, said virtual machine having coupled therein a processor and a memory, said method comprising:
   storing a file exception table comprising at least one first name of a host resource in a guest memory;

storing a file inclusion table comprising at least one second name of a guest resource in the guest memory;

receiving a resource query;

processing the resource query to determine a host weight value using a weighting operation and the file exception table;

processing the resource query to determine a guest weight value using the weighting operation and the file inclusion table;

comparing the host weight value to the guest weight value to determine whether the resource query is associated with the host resource or the guest resource;

determining whether the resource query matches the at least one first name of the host resource or the at least one second name of the guest resource;

receiving a query directory command and process the query directory command to obtain first results according to the file exception table;

processing the query directory command to obtain second results according to the file inclusion table and blend the first results with the second results to produce blended results; and writing the guest resource to the guest memory.

5. The method of claim 4 wherein the at least one second name of the guest resource comprises a registry filename.

6. The method of claim 4 wherein the at least one first name of the host resource is associated with a kernel object.

7. A software product for managing resources in a virtual machine, the software product stored in a storage readable medium when executed by a processor cause a computer to perform the steps:

storing a file exception table comprising at least one first name of a host resource in a guest memory;

storing a file inclusion table comprising at least one second name of a guest resource in the guest memory, receiving a resource query, processing the resource query to determine a host weight value using a weighting operation and the file exception table, processing the resource query to determine a guest weight value using the weighting operation and the file inclusion table, and comparing the host weight value to the guest weight value to determine whether the resource query is associated with the host resource or the guest resource;

receiving a query directory command and process the query directory command to obtain first results according to the file exception table;

processing the query directory command to obtain second results according to the file inclusion table and blend the first results with the second results to produce blended results;

determining whether the resource query matches the at least one first name of the host resource or the at least one second name of the guest resource;

writing the guest resource to the guest memory.

8. The software product of claim 7 wherein the at least one second name of the guest resource comprises a registry filename.

9. The software product of claim 7 wherein the at least one first name of the host resource is associated with a kernel object.

* * * * *